(12) United States Patent
Ohmura

(10) Patent No.: US 6,848,209 B2
(45) Date of Patent: Feb. 1, 2005

(54) REEL SEAT FOR FISHING ROD AND FISHING ROD INCORPORATING THE REEL SEAT

(75) Inventor: Ryuichi Ohmura, Shizuoka (JP)

(73) Assignee: Fuji Kogyo Co., Ltd., Shizuoka (JP)

(*) Notice: Subject to any disclaimer, the term of this patent is extended or adjusted under 35 U.S.C. 154(b) by 12 days.

(21) Appl. No.: 09/981,995

(22) Filed: Oct. 19, 2001

(65) Prior Publication Data

US 2002/0069574 A1 Jun. 13, 2002

(30) Foreign Application Priority Data

Dec. 8, 2000 (JP) ........................................ 2000-374760

(51) Int. Cl.[7] ............................................. A01K 87/06
(52) U.S. Cl. ........................................................ 43/22
(58) Field of Search ........................... 43/22, 23, 21.2, 43/17.5

(56) References Cited

U.S. PATENT DOCUMENTS

| | | | | |
|---|---|---|---|---|
| 651,148 A | * | 6/1900 | Shakespeare | 43/22 |
| 718,589 A | | 1/1903 | Tredwell | |
| 980,942 A | * | 1/1911 | Hanson | 43/23 |
| 1,013,333 A | * | 1/1912 | Tredwell | 43/23 |
| 1,591,122 A | | 7/1926 | Gephart | |
| 1,916,924 A | | 7/1933 | Foss | |
| 2,010,627 A | | 8/1935 | Dileo | |
| 2,084,931 A | * | 6/1937 | Williams | 43/23 |
| 2,148,612 A | * | 2/1939 | Scogland et al. | 463/52 |
| 2,283,816 A | * | 5/1942 | Loutrel | 43/23 |
| 2,504,801 A | | 4/1950 | Carlson | |
| 2,579,087 A | | 12/1951 | Organ | |
| 2,667,713 A | * | 2/1954 | Stephens | 43/22 |
| 2,965,995 A | * | 12/1960 | Loutrel | 43/19 |
| 3,123,931 A | | 3/1964 | Stephens | |
| 3,181,264 A | * | 5/1965 | Simone | 43/22 |
| 3,698,118 A | * | 10/1972 | Schultz | 43/22 |
| 4,077,150 A | * | 3/1978 | Barnes | 43/23 |
| 4,209,931 A | * | 7/1980 | Vance | 43/22 |
| 4,229,898 A | | 10/1980 | Urakami | |
| 4,355,480 A | | 10/1982 | Morishita | |
| 4,398,369 A | * | 8/1983 | Wiebe | 43/18.1 R |
| 4,403,439 A | * | 9/1983 | Wallace | 43/18.1 R |
| 4,439,945 A | * | 4/1984 | Chang et al. | 43/22 |
| 4,516,351 A | * | 5/1985 | Highby | 43/23 |

(List continued on next page.)

FOREIGN PATENT DOCUMENTS

| | | |
|---|---|---|
| GB | 487706 | 6/1938 |
| JP | 49-9177 | 3/1974 |

(List continued on next page.)

Primary Examiner—Charles T. Jordan
Assistant Examiner—Jordan M Lofdahl
(74) Attorney, Agent, or Firm—Oliff & Berridge, PLC

(57) ABSTRACT

A reel foot placing seat formed on a top portion of a circumferential surface of a body and a trigger protruding in a direction which is inclined in a backward-downward direction at approximately 30°, are provided on the circumferential surface of the body. A length of the portion crossing over a connection portion that connects a lower portion of the body to a front surface of this trigger is such that a user can place two fingers can be placed thereon. The user's two fingers placed thereon are aligned in a direction in which the angle is opened with respect to a direction perpendicular to a center axis X—X of a fishing body. Therefore, without a user significantly bending a wrist, a fishing rod can be firmly gripped. Furthermore, palming becomes possible in a position in which the body and the trigger are held by a user placing four fingers in front of the trigger in addition to placing the thumb on a reel. Therefore, there is no particular need for a strong grip in order to prevent rotating of the fishing pole in an axis rotation direction.

5 Claims, 9 Drawing Sheets

U.S. PATENT DOCUMENTS

| | | | | |
|---|---|---|---|---|
| 4,520,587 A | * | 6/1985 | Wallace | 43/18.1 R |
| 4,631,853 A | * | 12/1986 | Brackett et al. | 43/23 |
| 4,644,680 A | * | 2/1987 | Dawson | 43/18.1 R |
| 4,653,215 A | * | 3/1987 | Strader | 43/18.1 R |
| 4,653,217 A | * | 3/1987 | Ohmura | 43/20 |
| 4,654,996 A | * | 4/1987 | Gieselman | 43/23 |
| 4,697,376 A | * | 10/1987 | Brackett et al. | 43/23 |
| 4,793,087 A | * | 12/1988 | McGee | 43/23 |
| 4,839,981 A | * | 6/1989 | Yasui | 43/18.1 R |
| 4,864,764 A | * | 9/1989 | Yamato | 43/22 |
| D316,738 S | * | 5/1991 | Oyama | D22/142 |
| 5,222,319 A | * | 6/1993 | Yamato | 43/22 |
| 5,263,275 A | * | 11/1993 | Rumbaugh | 43/23 |
| 5,481,820 A | * | 1/1996 | Ohmura | 43/22 |
| 6,510,645 B2 | * | 1/2003 | Oguri | 43/20 |

FOREIGN PATENT DOCUMENTS

| | | |
|---|---|---|
| JP | 50-24539 | 7/1975 |
| JP | 51-8874 | 3/1976 |
| JP | 51-28306 | 7/1976 |
| JP | 53-8632 | 3/1978 |
| JP | 56-33237 | 8/1981 |
| JP | 56-97964 | 8/1981 |
| JP | 59-13826 | 4/1984 |
| JP | 1-127463 | 8/1989 |
| JP | 1-41289 | 9/1989 |
| JP | 1-168164 | 11/1989 |
| JP | 63-189835 | 2/1990 |
| JP | 63-330262 | 7/1990 |
| JP | 3-24053 | 5/1991 |
| JP | 5-16944 | 5/1993 |
| JP | 5-29027 | 7/1993 |
| JP | 6-31455 | 4/1994 |
| JP | 7-19260 | 5/1995 |
| JP | 7-34664 | 6/1995 |
| JP | 7-53492 | 12/1995 |
| JP | 8-1663 | 1/1996 |
| JP | 8-3265 | 1/1996 |
| JP | 2511718 | 7/1996 |
| JP | 2542612 | 4/1997 |
| JP | 9-205944 | 8/1997 |
| JP | 09-119729 | 11/1998 |
| JP | 09-128899 | 12/1998 |
| JP | 09-135299 | 12/1998 |
| JP | 2593528 | 2/1999 |
| JP | 09-289835 | 5/1999 |
| JP | 10-013513 | 7/1999 |
| JP | 10-203937 | 2/2000 |
| JP | 11-019401 | 2/2000 |
| JP | 10-367123 | 7/2000 |
| JP | 10-375908 | 7/2000 |
| JP | 11-005310 | 7/2000 |

* cited by examiner

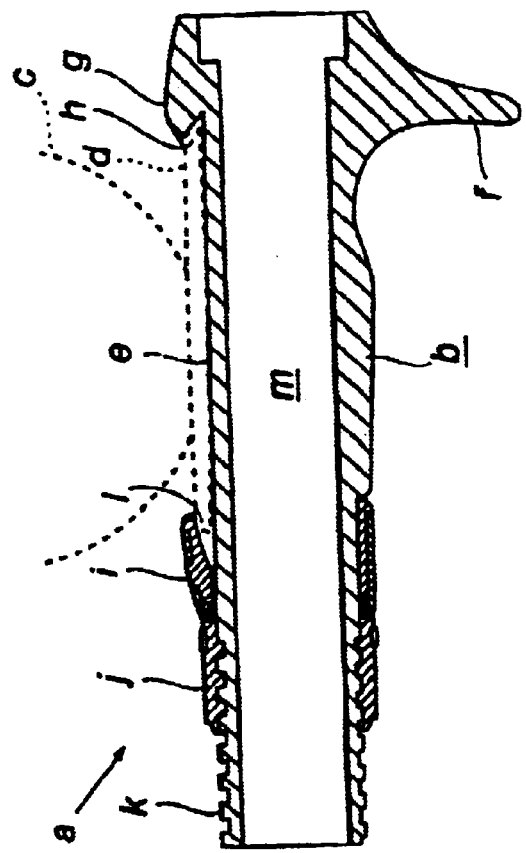
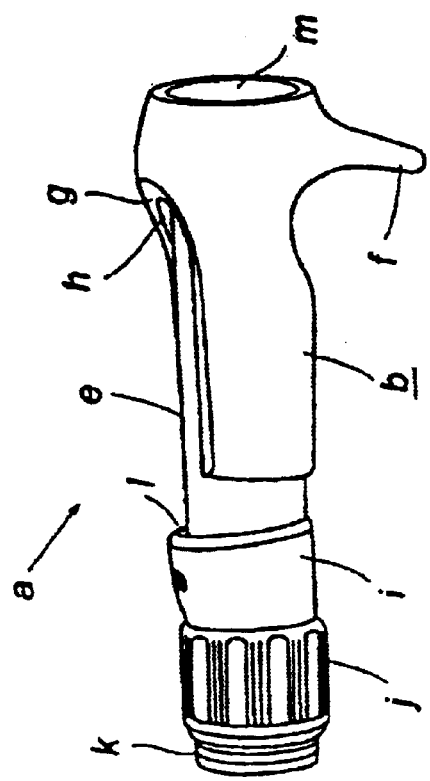
Fig. 10B
(RELATED ART)
Fig. 10A
(RELATED ART)

REEL SEAT FOR FISHING ROD AND FISHING ROD INCORPORATING THE REEL SEAT

BACKGROUND OF THE INVENTION

1. Field of Invention

This invention relates to a fishing rod and a reel seat for a fishing rod, and specifically to a reel seat, in which a top-mount style fishing reel is fixed on a fishing rod, and that is provided with a trigger which stabilizes a user's grip of the rod in the user's palm or during casting.

2. Description of Related Art

In a fishing rod which is designed to catch small to medium fish, and on which a top-mount style fishing rod reel, such as a coaxial receiving type reel, a bait reel, or the like is mounted, a trigger for use as a finger rest may be provided. The trigger may be in the form of a lever. Normally, a position and a protruding direction of this trigger are fixed, and the trigger is constituted as a portion of a reel seat on which a reel is mounted.

FIG. 9 shows one example of a fishing rod "r" that is provided with a reel seat with this type of trigger "f". FIGS. 10(A) and (B) show details of the reel seat "a".

The reel seat "a" has a pipe-shaped body "b". On the top of the right half of this body "b" (right direction in FIGS. 9 and 10(A) and (B)), a reel foot placing surface "e" is provided in a shape in which a fixing foot "d" of a reel "c" can be stably placed. From the bottom portion, a trigger "f", which has a tip with a relatively thin width, protrudes downward and slightly forward. The length of trigger "f" is approximately equal to a length in which one finger of a medium size adult can be placed (FIGS. 11(A) and (B)).

A fixed hood "g" is provided, which is integrally formed with the body "b" and has a flat opening "h" which covers the rear end portion of the reel foot placing surface "e". The trigger "f" protrudes from this fixed hood "g".

A pipe-shaped movable hood "i" is provided with a rotatably connected nut on the front side. The nut "j" is engaged to an engaging axial portion "k" which forms the front half portion of the body "b", and thus is attached to the body "b". An opening "l" of the rear end portion of the movable hood "i" covers the front end portion of the reel foot placing surface "e".

This type of reel seat "a" forms a portion of a fishing rod "r" by a fishing pole "n" being inserted and attached to a hole "m" of the body "b". The trigger "f" protrudes substantially perpendicular from the fishing rod pole.

The fishing pole "n" protrudes toward the rear of the body "b". A long handle "o" is externally fixed to this portion of fishing pole "n". Additionally, line guides "q" are attached in series on the front side of the body "b" from the reel seat "a" on the fishing pole "n".

When the reel "c" is mounted, one end portion of the fixing foot "d" is inserted into the fixed hood "g". The fixing foot "d" is placed on the reel foot placing surface "e". The nut "j" is tightened and the movable hood "i" is moved toward the rear direction. The other end portion of the fixing foot "d" is inserted relative to the movable hood "i", and the respective movable and fixed hoods "i" and "g" hold the fixing foot "d" onto the reel foot placing surface "e".

In this fishing rod "r", casting and palming are normally performed as follows.

FIGS. 11(A) and 11(B) show a user that has just completed a single hand cast. During single hand casting, an index finger of the hand holding the fishing rod "r" is placed on the trigger "f." A thumb is placed on a spool "p" of the reel "c" in order to measure the timing of line feed out. The handle "o" to the rear body "b" is gripped by the remaining three fingers. Furthermore, as shown in FIGS. 11(A) and 11(B), by facing the palm upward, a fishing rod "r" is positioned so that the bottom of the reel "c" faces sideways. Casting is performed by swinging the rod "r" in an overthrow motion toward a target.

Therefore, the trigger "f" of this case primarily prevents the fishing rod "r" from being thrown away.

In FIGS. 11(A) and 11(B), a case of single hand casting is shown. However, when casting is performed by both hands, other than gripping the tip of the handle "o" with the other hand, there is no significant difference in rod gripping compared to single hand casting.

As shown in FIGS. 13 and 14(A), the fishing rod "r" is supported by a user's palm after casting is completed so that the reel "c" and the reel seat "a" can be entirely covered by one hand. In this case, the tip of the user's thumb is placed on the top end of the periphery of the side wall of the reel "c", and the user's third finger or middle finger is placed on the trigger "f" (in the figures, placement of the third finger is shown). Therefore, the body "b" of the reel seat "a" is supported from the bottom by the user's three fingers. By so doing, the reel "c", which is the heaviest part of the fishing rod "r" and the reel seat "a" are held in the user's palm, so the user is less fatigued.

Depending on the user and the type of the reel "c", this palming can be performed by either hand.

Furthermore, conventionally this type of trigger "f" can have various shapes. There are many shapes which are substantially perpendicular to the fishing rod "r" or bent more slightly toward the front than of the fishing rod "r" (e.g., Japanese Patent Publication 2717338, Japanese Laid-Open Patent Application 9-205944, or the like). There are also triggers which are bent in an arc shape from a lower direction to a front side (Japanese Utility Model 51-8874, Japanese Laid-Open Utility Model Application 7-34664, or the like).

Additionally, the trigger "f" may be formed separate from the reel seat, and then fixed to the reel seat or the handle.

In a fishing rod with a conventional trigger "f" there is a significant burden to a user's wrist or elbow during casting and palming. It is also difficult to stabilize a fishing rod.

A main cause of these problems is a preconception that slipping during casting must be prevented by placing an index finger on a trigger. If a trigger is designed based on this concept, the trigger will have a shape and protruding direction so that when the user's index finger is placed on the trigger it is difficult to remove. In this state, the user's thumb can easily reach to the top surface or the rear surface of the spool of a reel. Therefore, the trigger protrudes at an angle which is substantially perpendicular to the fishing rod or bent toward a front side. The trigger is relatively close to the reel, with a length sufficient for a user to place one index finger on the trigger. Therefore the trigger is substantially immediately below a user's thumb placed on a rear side of the spool "p".

Many conventional triggers are designed based on this preconception, so that the shape, size, and protruding direction are substantially the same as the above-mentioned trigger "f".

As a result, if the fishing rod is gripped without a user bending a wrist or an elbow in an unnatural position, as seen in FIG. 11(B), the three fingers from the middle finger to the fourth finger, particularly the third finger and the fourth finger, generates a space "s", distant from the bottom of the body "b" and the handle "o". Therefore, the body "b" cannot be firmly gripped by all the user's fingers. In this case, the user's thumb is basically used to operate the reel and can hardly grip the fishing rod. Therefore, only the user's index finger and the middle finger can be actually used to firmly grip the fishing rod. In this state, the gripping force is not sufficient, so the fishing rod "r" can be unstable in the user's hand. The swinging force of the fishing rod "r" is also diminished. Therefore, the casting direction is not precise, and the maximum distance is diminished.

This is also true in the case of palming. As shown in solid lines in FIG. 13, if the fishing rod is gripped during palming without the user bending the wrist to an unnatural position, the third finger and the fourth finger are separated from the bottom of the body "b" and the handle "o", so a space "s" is generated.

Therefore, many users try to bend their elbows and wrists to an unnatural position in order to firmly grip the handle "o" and the body "b" with all their fingers even during casting and palming. That is, during palming, as shown by a user's arm by a 2-dotted chain line of FIG. 13, the fishing rod "r" is held by a user's wrist bent at approximately 90°. During casting, as shown in FIG. 12, a user grips a fishing rod by turning the fishing rod toward the inside from a shoulder to an elbow and by bending a wrist at approximately 90° toward the outside.

However, gripping in this manner creates a significant burden to a user's elbow and a wrist. As a result, casting is performed improperly, and operation mistakes such as mis-timing of hooking occur. In particular, during boat fishing, when a fishing rod drops down to the water, in order to easily support a fishing rod, palming may be performed for many hours. In this case the end of the handle "o" is sandwiched under the user's arm (see FIG. 13), so bending of the wrist is significant.

Furthermore, as described above, a conventional trigger "f" is immediately below the tip of the user's thumb placed on the reel "c". Therefore, if palming is performed in a natural manner, the user's fourth finger cannot be brought in front of the trigger "f". As a result, the trigger "f" must be sandwiched between the user's middle finger and the fourth finger or the middle finger and the third finger. Normally, during palming, the fishing rod is held for many hours until a fish is caught, so a user may have significant pain in the third finger and the fourth finger.

Additionally, only one of the user's fingers can be placed on a conventional trigger "f". Gripping needs to be performed with enough force to stably support the position of a fishing rod in an axial direction. That is, in this type of fishing rod, various actions can be taken in a position such that the reel, which is a heavy member, is on the top or side of the fishing rod, and the position becomes unstable because a rotational force constantly acts on the fishing rod in the axial direction. Therefore, rotation of the fishing rod due to this rotational force must be constantly prevented by the user. In this case, in the conventional trigger "f", a distance D (see FIG. 14(A)) between the user's finger placed on the trigger "f", and the tip of the thumb, which is placed in the reel "c", is not great, so the fishing rod needs to be gripped with enough force to firmly prevent the rotation of the fishing rod.

SUMMARY OF THE INVENTION

This invention's object is to solve the above-mentioned conventional problems. A further object of this invention is to provide a new fishing rod reel seat and a fishing rod which can be stably supported by substantially all the user's fingers which are placed in the rod, without bending an elbow and a wrist to an unnatural position, providing a strong gripping force during casting, and stably holding a posture of a fishing rod with a light gripping force during palming, with no need for sandwiching a trigger between the user's fingers.

In order to accomplish these objects, a fishing rod reel seat according to one exemplary embodiment of the invention is provided with an oblong pipe-shaped body through which a fishing pole passes, a reel foot placing surface formed on the top portion of the circumferential surface of the oblong pipe-shaped body, and a trigger protruding from the lower top portion of the circumferential surface of the oblong pipe-shaped body in a fixed position and angle. The front surface of this trigger slopes downward and backward and has a length such that a user can place at least two fingers thereon.

Additionally, a fishing rod according to one exemplary embodiment of the invention may be provided with a fishing pole on which line guides are mounted, a reel seat attached to this oblong pipe-shaped body and having a reel foot placing surface, on which a top-mount style reel fixing foot is detachably fixed, a handle extending from a position at which this reel seat exists toward a rear side, and a trigger protruding from a position opposite to the reel foot placing surface in a state in which a position and an angle are fixed. The front surface of this trigger slopes downward and backward and has a length such that at least two fingers or more can be placed thereon.

As a result, an inclination relationship between a central axis of a fishing rod, or a central axis of the oblong pipe-shaped body, and the trigger substantially matches an inclination relationship between a user's arm direction and an aligning direction of points where a user's fingers other than the thumb intersect the user's palm when a wrist is slightly bent, without any force.

Therefore, during casting, if a user's thumb is placed on a spool of a reel substantially from a rear side, the user's index finger and middle finger are placed on the front surface of the trigger. The user's remaining fingers are wrapped around the body or the handle behind the trigger, and the user's arm is horizontally extended to the front substantially parallel to the fishing rod. Then, the direction of alignment of the user's two fingers placed on the trigger extends downward and backward, and the user's remaining fingers are placed naturally on the body and handle. Therefore, all the user's fingers naturally grip the body and handle without the user bending a wrist to an unnatural angle or twisting the wrist inward.

Therefore, when a fishing rod is gripped in this manner. When casting is performed in a posture in which a point is directly targeted. A sufficient gripping force can be sufficiently applied, and a strong swing can be performed, without generating extra force on a user's wrist or elbow. The two fingers placed on the trigger prevent slipping.

Furthermore, according to one exemplary embodiment of this invention, the trigger extends downward at a backward angle, so the opposite side of the reel seat placing surface is open. Therefore, during palming, when a user's thumb is placed on the top end of the periphery of the side wall of the spool of the reel, the fishing rod and the body of the reel seat can be supported on a front side of the trigger by the remaining four fingers. In this case, the user's fourth finger is placed naturally at the tip portion of the trigger.

In this type of grip, in the same manner as during casting, there is no need for a user to bend a wrist at an unnatural angle. There will be no pain in the user's fingers because it is not necessary to sandwich the trigger between fingers. Therefore, in this case as well, a distance between a user's finger (fourth finger) placed on the tip of the trigger and the tip of the thumb placed on the reel may be increased. Depending on placement of the user's fourth finger, an external end (a position in the vicinity of a point where the fourth finger intersects the palm) of the palm is placed on a side surface of the trigger. This alone is enough to prevent the rod from rotating in an axial rotation direction of the pole.

Although not commonly noticed, the fourth finger has a significant role in gripping by a human's hand. This invention, which enables palming in which a fishing rod is supported by a user's four fingers, including the fourth finger, provides a more stable grip compared to palming with a fishing rod and reel seat provided with a conventional trigger.

In one exemplary embodiment of the invention, the most preferable degree of inclination of the front surface of the trigger, that is, the downward and backward opening angle with respect to a direction perpendicular to the body of the reel seat or the center axis of the fishing body, cannot be generally specified. However, an actual fishing rod test performed by the inventor and testers shows that depending on the size of the user's hand, even an opening angle of 25° to 55° allows a user to grip a fishing pole without significantly bending a wrist or elbow. In particular, in the case of 30°–50°, when casting or palming, there is less burden on the user's wrist, and gripping force can be sufficiently generated.

Furthermore, the front surface of the trigger can also be a shape which is linearly extended. The front surface of the trigger can also be a concave shape in which extremely moderate curves are drawn. If the trigger is a concave shape, the overall inclination angle should be within 25°-55°.

With respect to a fishing pole reel seat according to one exemplary embodiment of the invention, the tip portion of the area of the front surface of the trigger in which fingers can be placed may be positioned behind and immediately below the opening portion of the rear hood.

By so doing, during palming, even when the user's places four fingers (from the index finger to the fourth finger) in front of the trigger, the shape is such that the tip end of the thumb can be wrapped naturally around the top end of the periphery of the side wall of the reel with the thumb easily extended.

With respect to the fishing rod reel seat according to another exemplary embodiment of the invention, a sliding prevention protrusion protrudes, from the tip of the front surface of the trigger.

By so doing, the user's finger which is placed in the trigger can be prevented from sliding from the front surface.

BRIEF DESCRIPTION OF THE DRAWINGS

FIG. 10(A) is an enlarged perspective view of a reel seat provided on the fishing rod of FIG. 9, and FIG. 10(B) is a center perpendicular cross-sectional view of a reel seat provided on the fishing rod of FIG. 9.

DETAILED DESCRIPTION OF PREFERRED EMBODIMENTS

Figure 1:
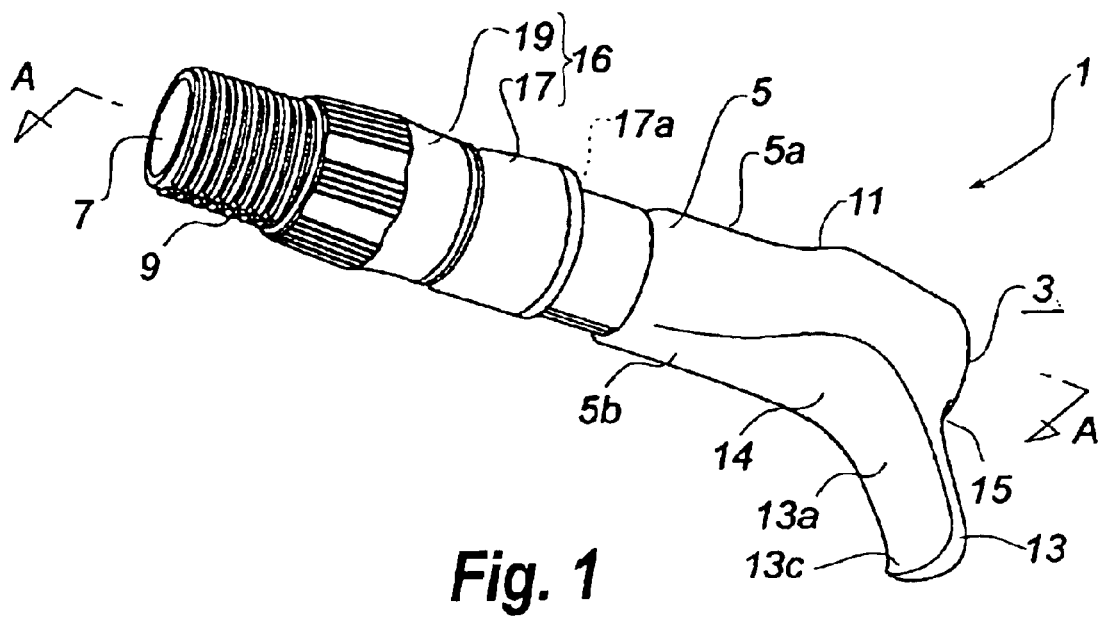
FIG. 1 is a perspective view of a fishing rod reel seat related to a first embodiment of this invention.
Figure 2:
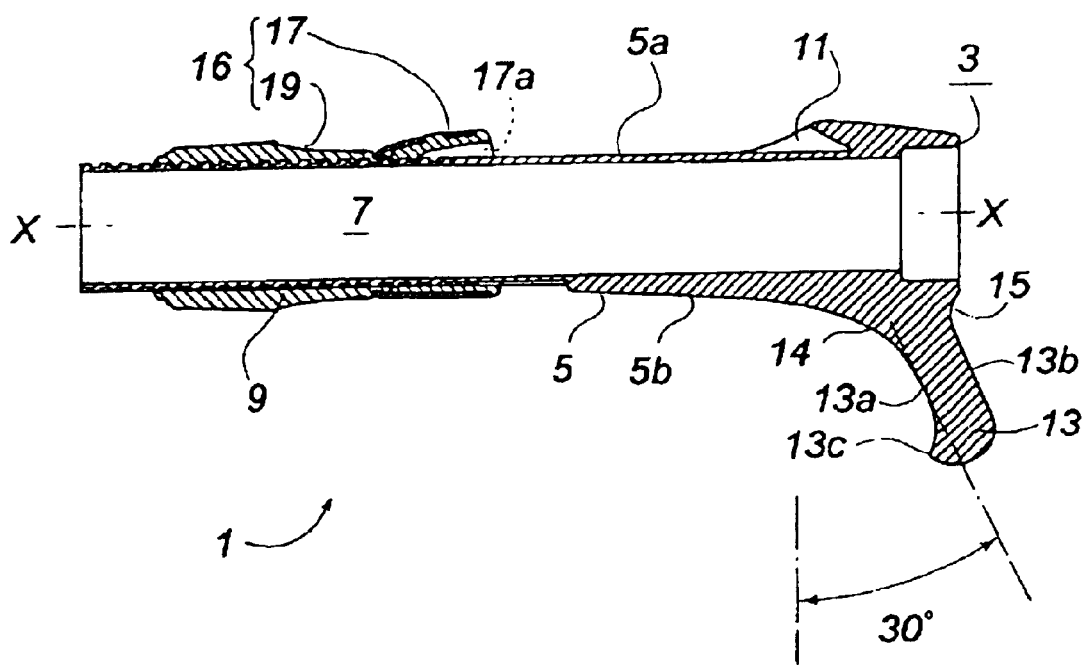
FIG. 2 is an enlarged cross-sectional view along line A—A of FIG. 1.

The following explains details of a fishing rod reel seat and a fishing rod of this invention in accordance with embodiments shown in the drawings.

1. First embodiment FIGS. 1–6 and 14(B)

FIGS. 1–6 show a fishing rod reel seat 1 and a fishing rod 21 related to a first embodiment. This reel seat 1 has a trigger 13 and a body 3 that are integrally formed. The fishing rod 21 is a type which is usually used for a boat fishing rod.

A. Reel seat

A reel seat 1 (see FIGS. 1–3 for details) is constituted by a body 3 in which the fixed hood 11 and the trigger 13, may be integrally formed by a synthetic resin or any other suitable material. A movable hood 16 fixed to the body 3.

The main portion 5 of the body 3 has a substantially oblong pipe shape having a pole body through hole 7. The front half portion is an engaging axis portion 9 in which a screw thread is formed on the circumferential surface (the direction toward an upper left direction in FIG. 1 is a front side [pole tip side], and the direction toward a lower right direction in the same figure is a rear side [pole end side]). A top portion of the outer circumferential surface of the rear half portion is a substantially flat reel foot placing surface 5a on which the fixing foot 33 of the reel 31 (see FIGS. 5, 6, or the like) can be stabilized.

The fixed side hood 11, has an internal space with the front opened in a half moon shape and positioned so as to cover the rear end portion of the reel foot placing surface 5a. The internal space narrows as it progresses rearward.

Overall, the trigger 13 is in the vicinity of the rear end of the lower portion 5b of the circumferential surface of the main portion 5 of the reel seat 1, and protrudes downward and rearward from substantially immediately below the portion of the rear side opposite the reel foot placing surface 5a. Specifically, this protruding direction is approximately 30° with respect to a direction perpendicular to a center axis X—X (this is a center axis of the fishing rod 21) of the main portion 5 (see FIG. 2).

Figure 3:
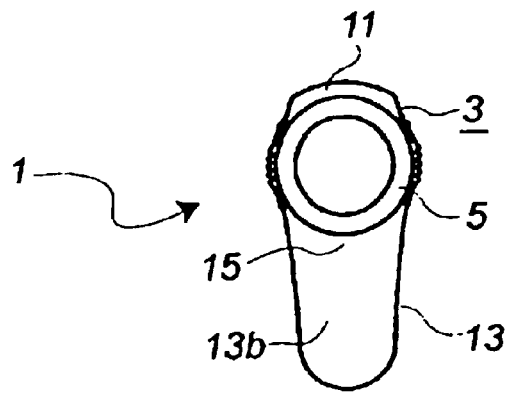
FIG. 3 is a rear view of the fishing rod reel seat shown in FIG. 1.

As shown in FIG. 3, the width of the trigger 13 is slightly narrowed as it goes to the tip end side. However, it is slightly narrower than the external diameter of the body 3. Therefore, compared to the conventional trigger "f", the width of the trigger 13 is quite large.

Additionally, the tip portion of the front surface 13a of the trigger 13 has a sliding prevention protrusion 13c which protrudes toward the front. As clarified from FIG. 2, the front surface 13a excluding the sliding protrusion 13c is concave so that, overall, a moderate arc is formed. An average inclination angle of the front surface 13a is also extended in a backward-downward direction, forming approximately a 30° opening with respect to a direction perpendicular to the center axis X—X of the main portion 5.

Furthermore, the portion 14, at which the front surface 13a and the lower portion 5b of the body 3 connect, is bent so as to form an arc. A user's finger(s) placed on the front surface 13a and a finger(s) placed on the lower portion 5a can be arranged without any significant gap.

Furthermore, a corner angle portion 15, at which the rear surface 13b of the trigger 13 and the lower portion 5b of the body 3 are connected is bent so as to form an arc with a diameter of approximately 20 mm. The side surface of a user's finger can be placed here without feeling awkward.

Figure 5:
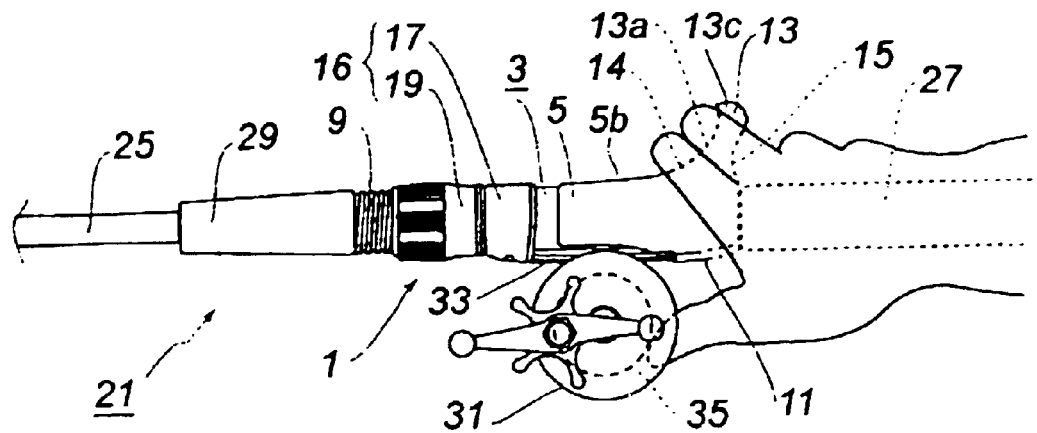
FIG. 5 is a diagram enlarging a main portion of FIG. 4.

Including the connection portion 14, the length of the front surface 13a excluding the sliding prevention protrusion 13c, has a length in which two fingers of an adult of medium size can be placed as shown in FIG. 5.

Furthermore, because of the trigger's 13 protruding position, protruding direction, and the length of the front surface 13a, a user's fingers placed on the sliding prevention protrusion 13c are positioned somewhat behind a position immediately below the rear end portion of the reel foot placing surface 5a (see FIG. 5).

The movable hood 16 is constituted by a hood portion 17 which has a substantially cylindrical shape in which the axial length is relatively shorter than the diameter. A nut 19 is rotatably connected to the hood 17 from the rear side. The upper portion of the rear end portion of the hood portion 17 has a radius larger than the remaining portion and has a flat reel foot insertion opening 17a. Furthermore, the reel foot insertion opening 17a faces the rear side direction. The nut 19 is engaged to the engaging axis portion 9 of the body 3, and the hood portion 17 is prevented from being rotated by an undepicted engaging protrusion engaged to an engaging groove of the main portion 5.

B. Mounting of a fishing rod and a reel seat

The reel seat 1 is fixed to the fishing rod body 25 by inserting a portion of the fishing rod body, forming a base of the fishing rod 21 through hole 7 of the body 3. Furthermore, a long cylindrical handle 27 is externally engaged and fixed to the portion which protrudes in the rear direction from the body 3.

Furthermore, a front handle 29, which also prevents removal of the movable hood 16, is fixed to the front end portion of the body 3, leaving a sliding area for the movable hood 16.

The trigger 13 is integrally formed with the body 3 of the reel seat 1. Therefore, the reel seat 1 is fixed to the fishing rod body 25, so the position and the angle on the fishing rod 21 are fixed.

When the reel 31 is mounted, as one end portion of the fixing foot 33 is inserted to the fixed side hood 11, the fixing foot 33 is placed on the reel foot placing surface Sa. The reel 31 is then moved in a rearward direction as the nut 19 of the movable hood 16 is rotated. By so doing, the other end portion of the fixing foot 33 inserted into the movable hood 16, and the respective movable and fixed hoods 16 and 11 function together to hold the fixing foot 33 against the reel foot placing surface 5a.

C. Handling of a fishing rod and operation of a trigger FIGS. 4–6, 14

Casting and palming with this fishing pole 21 are basically performed as follows.

Figure 4:
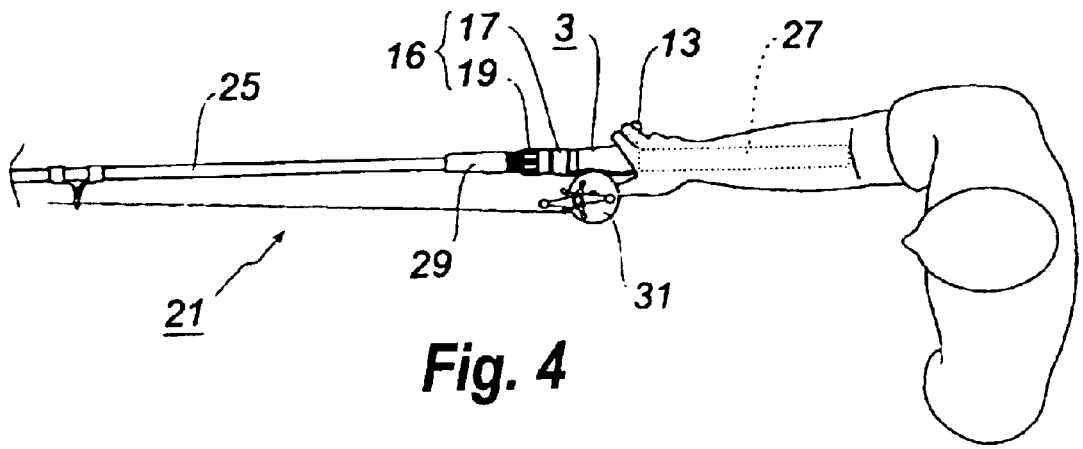
FIG. 4 is a main portion plan view of one example of a fishing rod, shown in a casting state, on which a fishing rod reel seat shown in FIG. 1 is mounted.

As shown in FIGS. 4 and 5, during casting, when a user's palm (right arm is shown in the figure) is placed against the side surface of the handle 27 and the rear end portion of the body 3, the tip of the thumb is placed against the spool 35 of the reel 31 substantially from the rear side. At the same time, the user's index finger and middle finger are placed together, and the inside of the second joint of these fingers is placed on the front surface 13a (including the connection portion 14) of the trigger 13. The user's third finger is placed on the corner angle portion 15.

The shape of the user's hand in this state is substantially the same as the shape in which fingers other than the thumb are folded in a U shape when a wrist is slightly bent without any force, and the index finger and the thumb are opened at 60°. Therefore, even if a user's wrist or elbow is not bent in an unnatural angle, a fishing rod can be firmly gripped by four fingers other than the thumb and palm when the fishing rod body 25 is substantially parallel to the user's arm. Furthermore, the user places two fingers on the trigger 13. Additionally, the width of the trigger 13 is much larger than the conventional trigger "f" described before. Therefore, unlike a protruding shape in which a user can only place one finger, as in the conventional trigger "f", the body 3 and the handle 27 can be strongly pulled to the palm. At the same time, sliding is prevented.

Therefore, a user can have a strong grip. At the same time, the fishing rod can be held stably, so casting can be accurately controlled.

Figure 6:
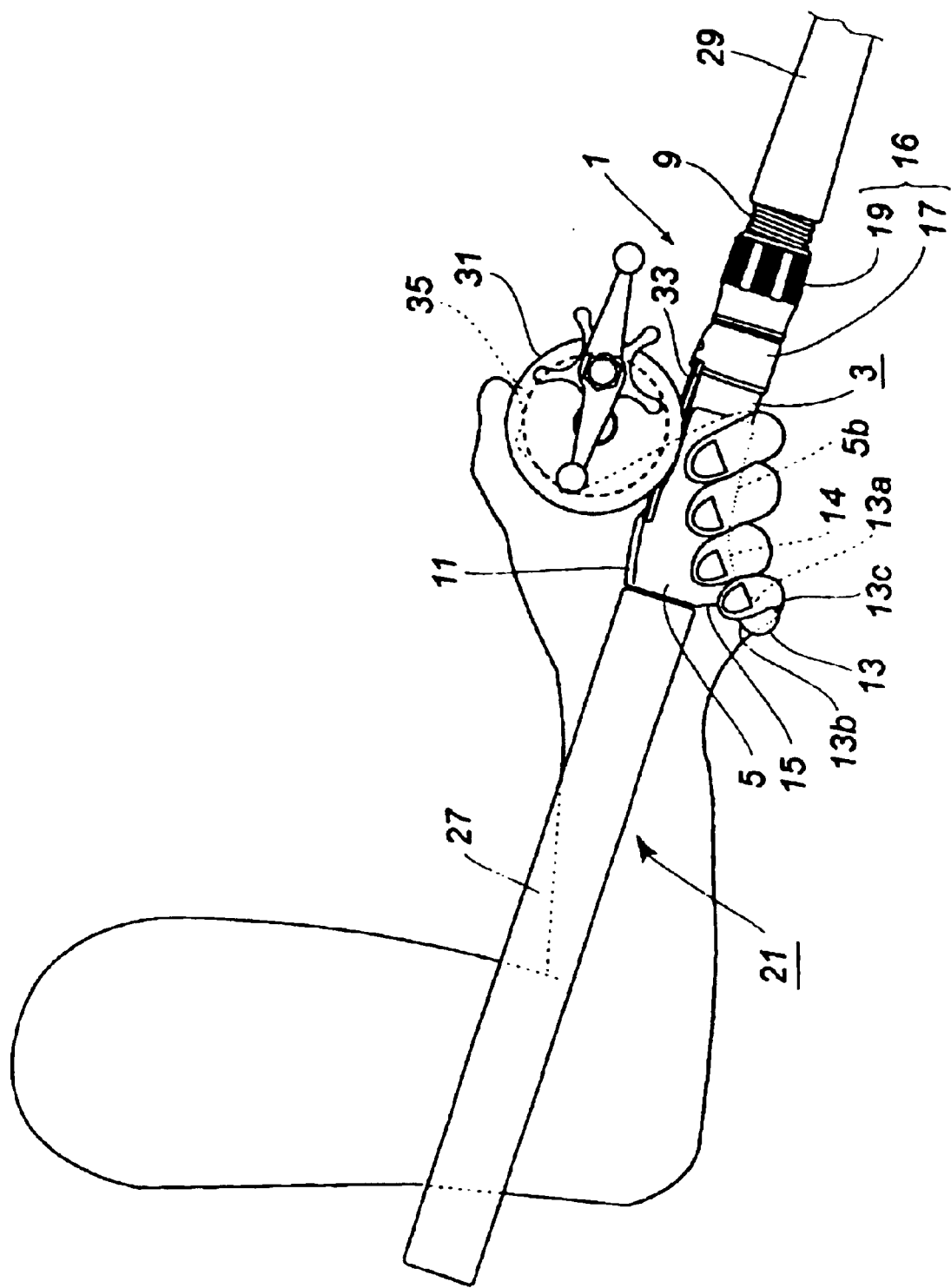
FIG. 6 is a main portion perspective view of the fishing rod shown in FIG. 4 shown in a palming state.
Figure 14B:
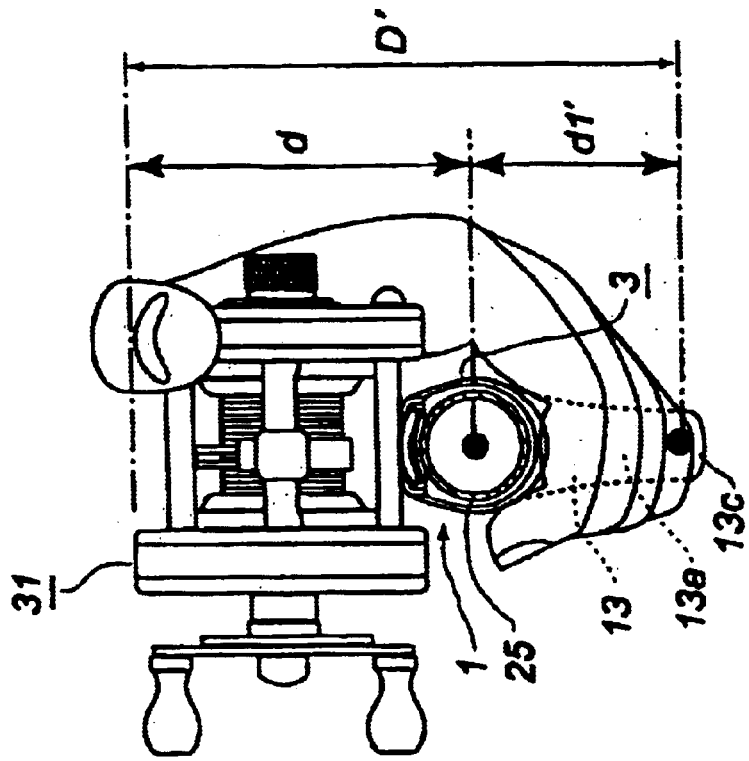
FIGS. 14(A) and (B) are plan views showing comparison between a palming state in the case of a conventional trigger and a palming state in the case of a trigger related to an embodiment.

Furthermore, during palming, as shown in FIGS. 6 and 14(B), the tip of the user's thumb is placed on the top end of the periphery of the side wall of the reel 31, and the fourth finger is placed on the sliding prevention protrusion 13c of the trigger 13. A wide range, from the trigger 13 to the body 3, is gripped by the user's four fingers other than the thumb, so as to be supported from the bottom.

With respect to the position of the user's hand in this state, the wrist is not bent in an unnatural position. Therefore, as shown in FIG. 6, even during palming with the fishing rod 21 positioned in a frontward and downward direction, the wrist can be bent naturally without any force.

Additionally, in this grip, as clarified from FIG. 6, the tip portion of the trigger 13 is placed naturally at the point where the user's fourth finger attaches to the palm (portion in the vicinity of the point where the fourth finger intersects the palm), or at the end of the palm. Furthermore, the longest distance from the thumb, which is placed on the reel, to the finger, which is placed on the trigger, becomes greater than in the case of the conventional trigger "f". Therefore, the fishing rod can be easily supported.

Figure 14A:
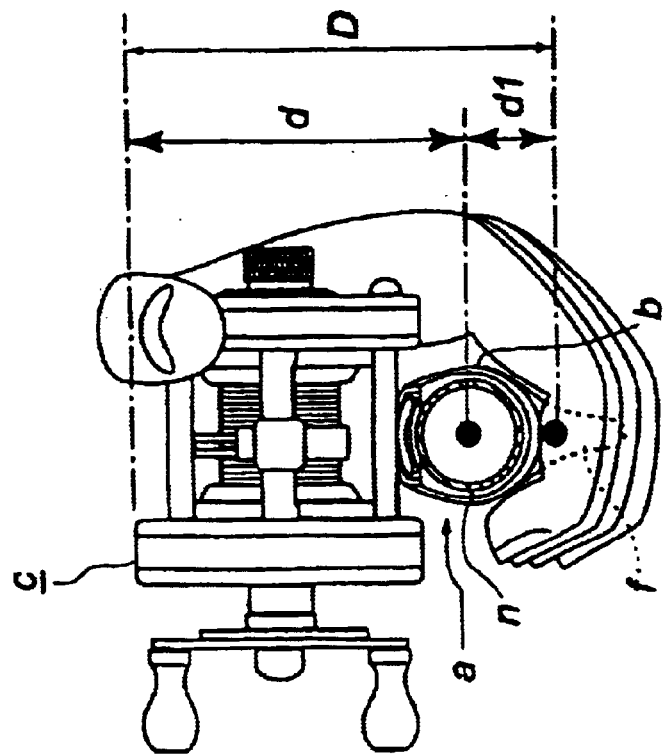

A comparison can be made between FIG. 14(A) showing palming when using a conventional trigger "f" and FIG. 14(B) showing palming when using the trigger 13 related to this embodiment (the reels "c" and 31 are the same). A distance "d" exists from the top portion of the reel "c" and 31 to the center axis of the body "b" and 3. A distance d1'exists from the user's fourth finger, placed in the vicinity of the tip of the trigger 13, to the center axis of the body 3 and is several times longer than the distance d1, from the user's finger placed in the conventional trigger "f"(the fourth or middle finger) to the center axis of the body "b". Thus, a distance D' between the user's fourth finger placed in the vicinity of the tip of the trigger 13, and the tip of the thumb is much greater than distance D. Therefore, a force which prevents rotating of the fishing rod 21 in the axis rotation direction can be much smaller. Also, the fatigue of palming for long hours can be extremely reduced.

Additionally, in this grip, the trigger 13 is not sandwiched between the user's fingers, so finger pain can be avoided.

2. Second embodiment FIGS. 7 and 8

Figure 7:
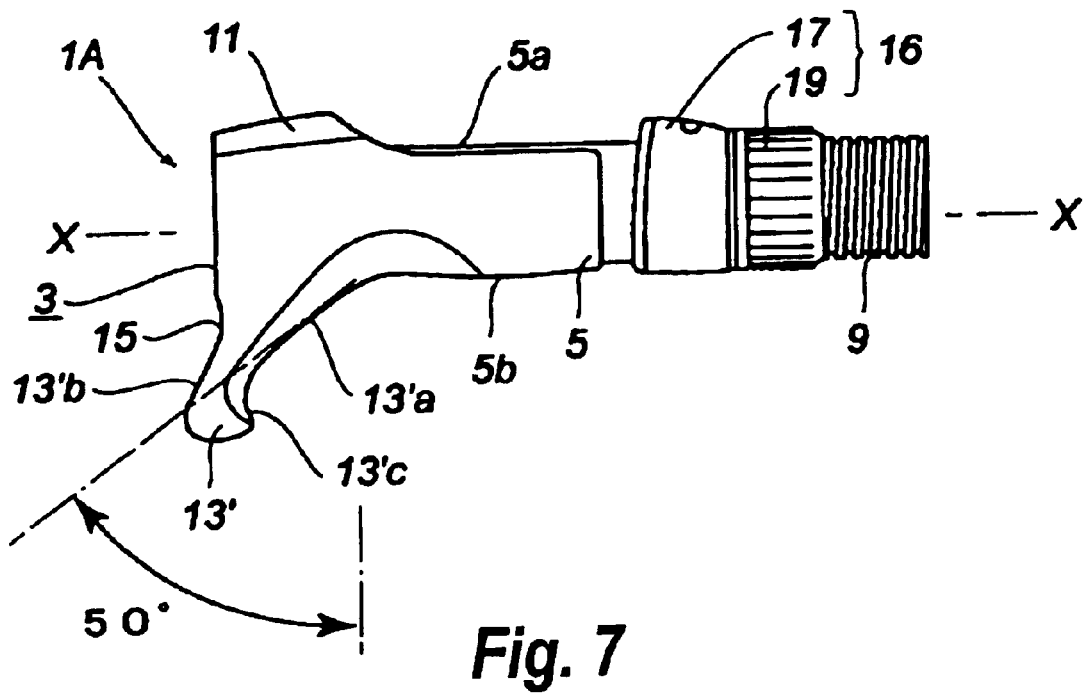
FIG. 7 is a perspective view showing a fishing rod reel seat related to a second embodiment of this invention.
Figure 8:
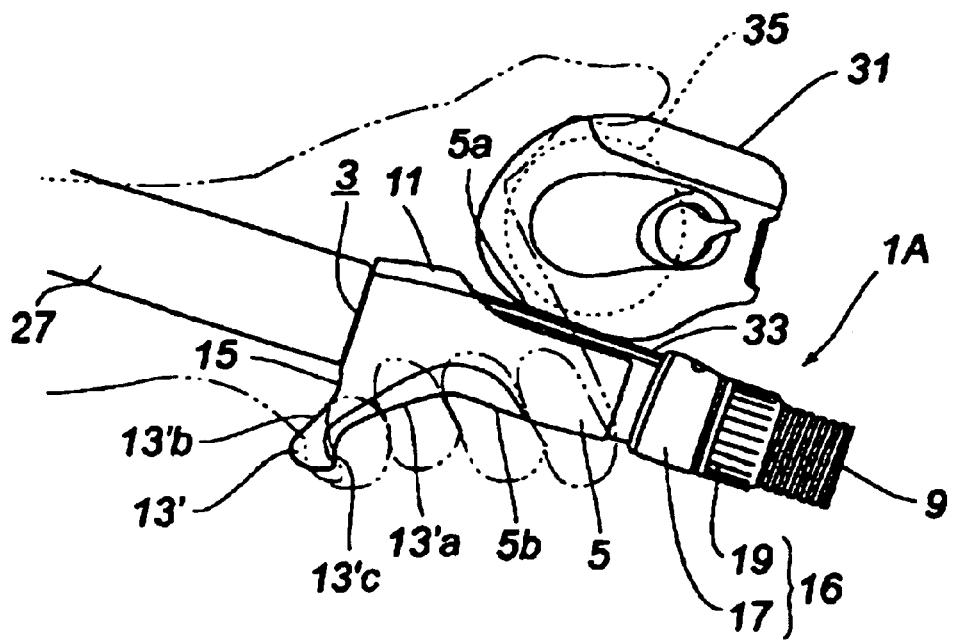
FIG. 8 is a perspective view showing a palming state of the fishing rod reel seat shown in FIG. 7.
Figure 9:
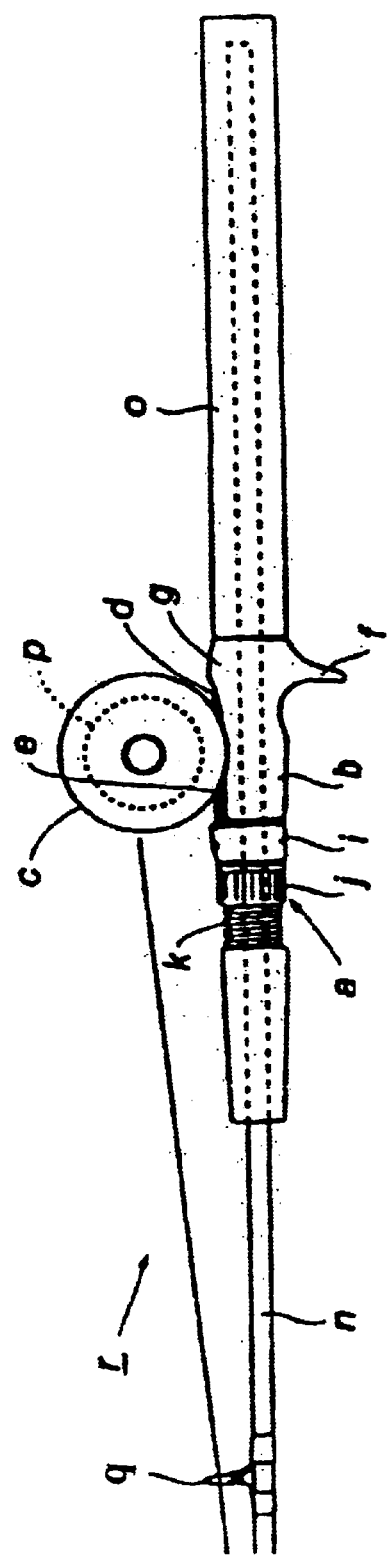
FIG. 9 is a main portion perspective view showing an example of a fishing rod with a conventional trigger.
Figures 11A, 11B:
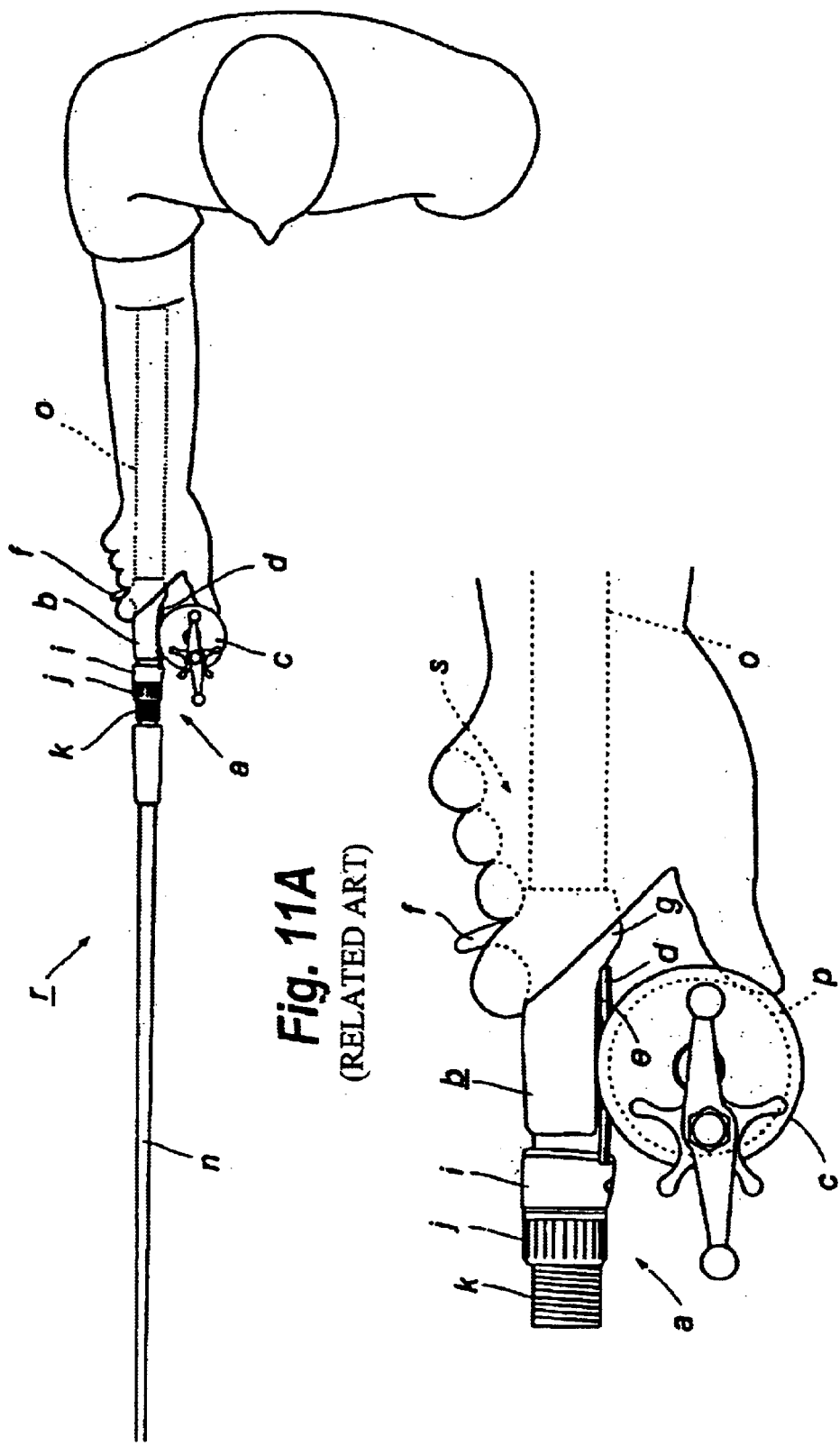
FIG. 11(A) is a plan view showing a state in which casting is performed by the fishing rod of FIG. 9.
FIG. 11(B) is a main portion enlarged view of the FIG. 11(A).
Figure 12:
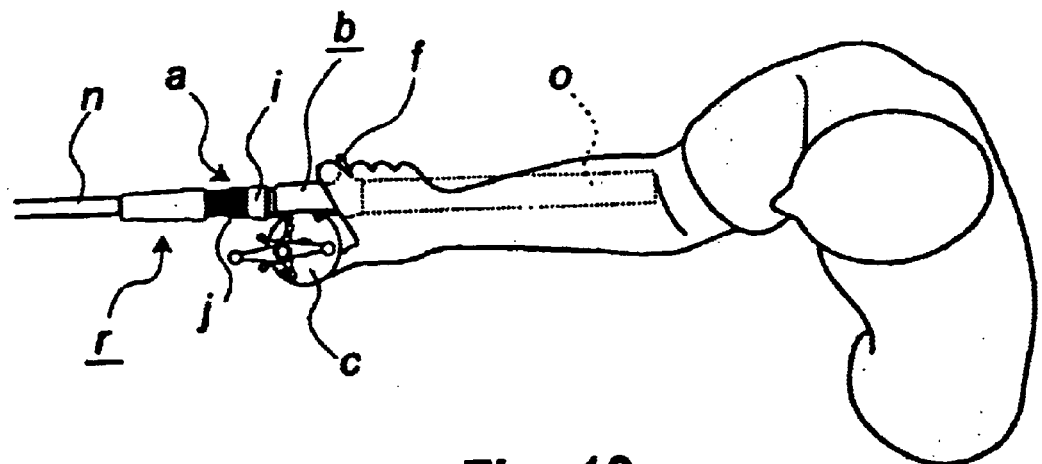
FIG. 12 is a plan view showing a state in which casting is performed with the fishing rod of FIG. 9, with the elbow twisted.
Figure 13:
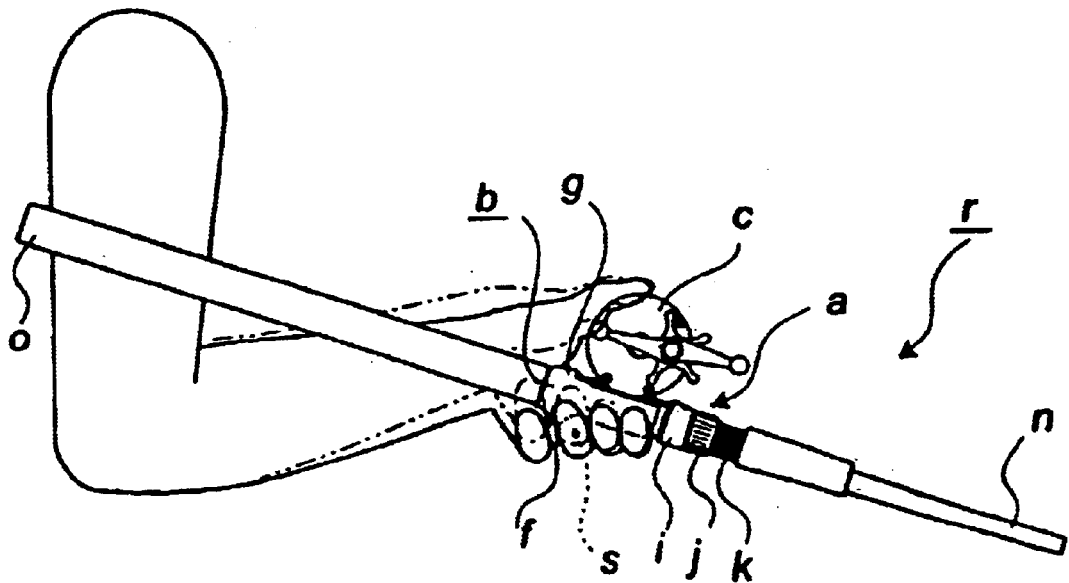
FIG. 13 is a perspective view showing a state in which palming is performed with the fishing rod shown in FIG. 9.

FIGS. 7 and 8 show a fishing rod reel seat 1A related to a second embodiment. The difference between this reel seat 1A and the reel seat 1, shown in the first embodiment, is mainly the trigger inclination. Therefore, an explanation will be given for the differences only. Other portions, which are similar to previously described portions, use the same numerals as the similar portions in the drawings, or numerals with ' (prime) are used. An explanation of the similar portions is omitted.

The shape of the trigger 13' in the reel seat 1a in the second embodiment is a shape which is appropriate for a fishing rod mainly used for bass fishing. The inclination angle of the trigger 13 (opening angle which is downward and backward with respect to a direction perpendicular to the center axis X—X of the body 3) is about 50°. This is larger than the inclination angle of the trigger 13, for the following reasons. In contrast to boat fishing, in bass fishing, a fishing rod end is hardly ever sandwiched under the arm, and various postures are used to grip a fishing rod by one hand. Therefore, large bending of a wrist is not needed.

Furthermore, with respect to the front surface 13'a of the trigger 13', the overall front surface is substantially extended at about 50° in a linear manner. Therefore, as shown in FIG. 8, the aligning direction of a user's two fingers placed on the front surface 13'a, is substantially the same as the direction of the front surface 13'a.

Thus, embodiments of this invention are explained. Specific structure of this invention is not limited to these embodiments. Design changes, or the like, within the scope of the claims of this invention, are also included in this invention.

For example, in this embodiment, a trigger is integrally formed with a body of a reel seat, but the trigger in this invention can also be formed separately from a reel seat. A shape of the reel seat is not limited to a pipe shape. A so-called plate shape or any other suitable shape may be used.

Thus, according to a fishing rod reel seat and a fishing rod of this invention, a fishing rod can be firmly gripped by a user placing two fingers on a trigger without bending an elbow or wrist to an unnatural position. Therefore, a user can apply a sufficient gripping force and the fishing rod can be stably held. Accordingly, control during casting is easy, and a strong swing is also possible.

Furthermore, during palming, in a state in which a user's thumb is placed on the top end of the periphery of the side wall of the reel, the remaining four fingers can hold the fishing rod so as to support a body of a reel seat and the fishing rod body in front of a trigger, which was not conventionally possible. In this gripping method, the user's wrist is not bent to an unnatural position, and there is no pain in the fingers because a trigger does not have to be sandwiched between fingers. Additionally, a distance between a user's finger (fourth finger) placed at the tip of the trigger or in the vicinity of the tip end of the trigger and the tip of the thumb placed on the reel can be extended. In particular, depending on placement of the user's fourth finger, an external end of the palm (a portion in the vicinity of point where the fourth finger intersects the palm) contacts the side surface of the trigger, so even simply because of this, rotating of the fishing rod in the axis rotation direction can be easily prevented. Therefore, the force required to grip a fishing rod is reduced, so palming for long hours can be easily performed.

According to one exemplary embodiment of the invention, during palming, even in a state where a user places four fingers (the index finger through the fourth finger) in front of the trigger, the shape is such that the tip of the thumb can be placed naturally around the top end of the periphery of the side wall of the reel where the thumb can be easily extended.

According to another exemplary embodiment of the invention, a user's finger placed in the trigger can be substantially prevented from slipping off of the front surface.

What is claimed is:

1. A reel seat for a fishing rod, that includes a fishing rod body, comprising:

an oblong pipe-shaped body through which the fishing rod body passes, the oblong pipe-shaped body defining a circumferential surface with a top portion and a lower portion;

a reel foot placing surface formed on the top portion of the circumferential surface of the oblong pipe-shaped body that receives a reel foot;

a movable front hood and a fixed rear hood, that attach the reel foot to the reel foot placing surface;

a trigger protruding from the lower portion of the circumferential surface of the oblong pipe-shaped body at a fixed position and angle, the trigger having a front surface, the front surface of the trigger sloping substantially toward a downward and backward direction relative to a rear end of the lower portion of the circumferential surface of the oblong pipe-shaped body and having a length such that at least two of an average size adult user's fingers can be placed thereon, wherein a center axis of the trigger is non-perpendicular with respect to a center axis of the fishing rod body; and a rear body extending along the same axis as the fishing rod;

wherein a tip portion of an area of the front surface of the trigger on which a user's fingers can be placed is positioned behind a portion immediately below the highest position of an opening portion of the fixed rear hood.

2. The reel seat for the fishing rod as set forth in claim 1, wherein an inclination angle of the front surface of the trigger with respect to a direction perpendicular to a center axis of the fishing rod body, is in a range of about 25° to about 55°.

3. The reel seat for the fishing rod as set forth in claim 1, wherein a sliding prevention protrusion protrudes from a tip of the front surface of the trigger.

4. A fishing rod, comprising:

a fishing rod body, on which line guides are mounted;

a reel seat;

a handle that extends backward from a position of the reel seat; and a trigger protruding from a position opposite to a reel foot placing surface at a fixed position and angle, the trigger having a front surface, the front surface of the trigger sloping substantially downward and backward relative to a rear end of a lower portion of the reel seat and having a length such that at least two of an average size adult user's fingers can be placed thereon, wherein a center axis of the trigger is non-perpendicular with respect to a center axis of the fishing rod body; and a rear body extending along the same axis as the fishing rod;

wherein a tip portion of an area of the front surface of the trigger on which a user's fingers can be placed is positioned behind a portion immediately below the highest position of an opening portion of a fixed rear hood that attaches a reel foot to the reel foot placing surface.

5. A method of gripping a fishing rod which comprises a fishing rod body, on which line guides are mounted, a reel seat, a handle that extends backward from a position of the reel seat, and a trigger protruding from a position opposite to a reel foot placing surface at a fixed position and angle, the trigger having a front surface, the front surface of the trigger sloping downward and backward and having a length such that at least two of a user's fingers can be placed thereon wherein a tip portion of an area of the front surface of the trigger on which a user's fingers can be placed is positioned behind a portion immediately below the highest position of an opening portion of a fixed rear hood that attaches a reel foot to the reel foot placing surface, the method comprising the step of:

placing at least two fingers on the front surface of the trigger.

* * * * *